US010112486B2

United States Patent
Ban et al.

(10) Patent No.: US 10,112,486 B2
(45) Date of Patent: Oct. 30, 2018

(54) APPARATUS FOR DETECTING GAS LEAKAGE OF A VEHICLE EQUIPPED WITH A FUEL CELL SYSTEM

(71) Applicant: HYUNDAI MOTOR COMPANY, Seoul (KR)

(72) Inventors: Hyeon Seok Ban, Yongin-si (KR); Ho June Bae, Seoul (KR); Ji Hyun Shim, Seoul (KR)

(73) Assignee: Hyundai Motor Company, Seoul (KR)

( * ) Notice: Subject to any disclaimer, the term of this patent is extended or adjusted under 35 U.S.C. 154(b) by 167 days.

(21) Appl. No.: 15/380,624

(22) Filed: Dec. 15, 2016

(65) Prior Publication Data

US 2018/0079309 A1 Mar. 22, 2018

(30) Foreign Application Priority Data

Sep. 21, 2016 (KR) ........................ 10-2016-0120672

(51) Int. Cl.
*B60L 3/00* (2006.01)
*B60L 11/18* (2006.01)
(Continued)

(52) U.S. Cl.
CPC ......... *B60L 3/0053* (2013.01); *B60L 11/1881* (2013.01); *H01M 8/04373* (2013.01); *H01M 8/04671* (2013.01); *H01M 2250/20* (2013.01)

(58) Field of Classification Search
CPC .......... G01N 27/4175; G01N 27/4067; G01N 27/16; G01N 27/407; F02D 41/1456; F02D 41/1495; F02D 41/123; F02D 41/1494; H01M 8/04097; H01M 8/04089; H01M 8/04388; H01M 8/04402; H01M 8/04664; H01M 8/04947; H01M 8/0662
(Continued)

(56) References Cited

U.S. PATENT DOCUMENTS 6,336,354 B1 * 1/2002 Suzuki ............... G01N 27/4067
338/34
7,066,017 B2 6/2006 Kano
(Continued)

FOREIGN PATENT DOCUMENTS

JP 1993346079 A 12/1993
JP 2004061433 A 2/2004
(Continued)

*Primary Examiner* — Anne M Antonucci
*Assistant Examiner* — Sanjeev Malhotra
(74) *Attorney, Agent, or Firm* — Lempia Summerfield Katz LLC

(57) ABSTRACT

A device for detecting leakage of gas of a fuel cell vehicle includes a gas sensor configured to determine whether gas leaks based on a change in a temperature by a catalyst reaction and a vehicle control unit including a comparator configured to read a variation in temperature from the gas sensor, and configured to control a fuel cell vehicle. A power application state is maintained in the comparator in a power off state of the fuel cell vehicle. Power of the gas sensor is switched at regular periodic intervals. The comparator determines the variation in temperature measured by the gas sensor, and, when the variation in temperature exceeds a predetermined value, the power of the gas sensor is switched to normal power.

10 Claims, 3 Drawing Sheets

(51) Int. Cl.
*H01M 8/04664* (2016.01)
*H01M 8/0432* (2016.01)

(58) Field of Classification Search
USPC .......... 701/114; 73/1.06, 23.2, 114.72;
204/401; 340/632; 324/537; 374/141,
374/144; 338/34; 429/424, 429, 434,
429/444; 123/688
See application file for complete search history.

(56) References Cited

U.S. PATENT DOCUMENTS

| | | | |
|---|---|---|---|
| 8,770,012 B2 | 7/2014 | Yahashi et al. | |
| 2002/0003831 A1* | 1/2002 | Hashimoto | G01K 15/00 374/144 |
| 2004/0047396 A1* | 3/2004 | Nomura | F02D 41/1476 374/141 |
| 2005/0039525 A1 | 2/2005 | Wakahara et al. | |
| 2005/0155405 A1* | 7/2005 | Sasaki | G01N 27/16 73/1.06 |
| 2005/0284208 A1* | 12/2005 | Oishi | G01N 33/0032 73/23.2 |
| 2005/0288847 A1* | 12/2005 | Inoue | G01N 27/4175 701/114 |
| 2006/0114113 A1* | 6/2006 | Yokosawa | G01N 33/0063 340/632 |
| 2006/0157348 A1* | 7/2006 | Inoue | F02D 41/1494 204/401 |
| 2007/0202367 A1* | 8/2007 | Yoshida | H01M 8/04089 429/434 |
| 2007/0207355 A1* | 9/2007 | Yoshida | H01M 8/04097 429/444 |
| 2007/0273540 A1* | 11/2007 | Inoue | G01N 27/407 340/632 |
| 2008/0196489 A1* | 8/2008 | Fukagai | F02D 41/123 73/114.72 |
| 2008/0196702 A1* | 8/2008 | Fukagai | F02D 41/1456 123/688 |
| 2009/0239105 A1* | 9/2009 | Yoshida | H01M 8/04432 429/424 |
| 2012/0001641 A1* | 1/2012 | Tsukada | G01N 27/4065 324/537 |
| 2012/0135326 A1* | 5/2012 | Cherchi | H01M 8/04097 429/429 |

FOREIGN PATENT DOCUMENTS

| | | | | |
|---|---|---|---|---|
| JP | 2007009891 A | 1/2007 | | |
| JP | 2007092585 A | 4/2007 | | |
| JP | 2012112306 A | 6/2012 | | |
| JP | 5662484 B2 | 1/2015 | | |
| JP | 2016220297 A | * 12/2016 | | H02M 3/00 |
| KR | 1020090013362 A | 2/2009 | | |

* cited by examiner

APPARATUS FOR DETECTING GAS LEAKAGE OF A VEHICLE EQUIPPED WITH A FUEL CELL SYSTEM

CROSS-REFERENCE TO RELATED APPLICATION

This application claims under 35 U.S.C. § 119(a) the priority benefit of Korean Patent Application No. 10-2016-0120672 filed on Sep. 21, 2016, the entire contents of which are incorporated herein by reference.

BACKGROUND

(a) Technical Field

The present disclosure relates to an apparatus for detecting leakage of gas from a vehicle equipped with a fuel cell system, and a method of controlling the apparatus.

(b) Background Art

A vehicle (hereinafter, referred to as a "fuel cell vehicle") equipped with a fuel cell system is operated by a scheme, in which hydrogen is fuel, and a motor is driven by using charges generated by reacting hydrogen and oxygen to generate momentum. Accordingly, a hydrogen storing system essentially needs to be mounted or installed in the fuel cell vehicle. Currently, a high-pressure hydrogen storing system with 700 bars, of which the commercialization performance is highest, has been most widely and globally used.

The fuel cell vehicle may be generally divided into an air supply system, a hydrogen supply system, a system managing water and heat, and a vent system. The air supply system is a system supplying air (oxygen) to a stack so that air (hydrogen) may be reacted with hydrogen in a fuel cell stack. The hydrogen supply system is a system supplying hydrogen to the fuel cell stack. The system managing water and heat serves to maintain water balance by supplying moisture required in the entire fuel cell system, and to maintain heat generated during the reaction of hydrogen and oxygen in the stack within an appropriate temperature range. The vent system serves to discharge or recirculate air, hydrogen, and moisture, which are left after being used for the reaction in the fuel cell stack.

The fuel cell vehicle generates power, which is required for driving the vehicle, through a chemical reaction between the stored hydrogen and oxygen. In this type of vehicle, hydrogen used as fuel is a colorless, tasteless, and odorless gas. Hydrogen used as fuel is also highly explosive, so that hydrogen has an easily ignitable property even with very micro static electricity. Accordingly, detecting leakage of hydrogen used as the fuel for the fuel cell vehicle and responding to the leakage of the hydrogen are inevitably very important factors in safety for the vehicle.

Korean Patent Application Laid-Open No. 2009-0013362 (Feb. 5, 2009) and Japanese Patent Application Laid-Open No. 2007-092585 (Apr. 12, 2007) disclose prior known fuel cell vehicles of this type.

The above information disclosed in this Background section is only to assist in understanding the background of this disclosure and therefore it may contain information that does not form or fall within the prior art that is already known to a person of ordinary skill in the art.

SUMMARY OF THE DISCLOSURE

The present disclosure is made in an effort to solve the above-described problems associated with the prior art.

Various embodiments of the present disclosure provide an apparatus and a method for detecting leakage of gas, which may continuously detect leakage of gas even in a starting-off situation of a vehicle, and for responding to the leakage of the gas.

In one aspect, the present disclosure provides a device for detecting leakage of gas of a fuel cell vehicle. The device includes a gas sensor configured to determine whether gas leaks based on a change in a temperature by a catalyst reaction, and a vehicle control unit including a comparator reading a variation in temperature from the gas sensor, and configured to control a fuel cell vehicle. A power application state is maintained in the comparator in a power off state of the fuel cell vehicle. Power of the gas sensor is switched at regular periodic intervals, and the comparator determines the variation in temperature measured by the gas sensor. When the variation in temperature exceeds a predetermined value, the power of the gas sensor is switched to normal power.

In one embodiment, the device may further include: a micro controller unit (MCU) within the vehicle control unit; a vehicle control unit power supply configured to supply power to the vehicle control unit; a detecting unit including a catalyst layer inside the gas sensor; and a referring unit, which does not include a catalyst layer inside the gas sensor. After the power of the gas sensor is switched to the normal power, when the concentration of gas measured by the detecting unit exceeds a predetermined value, power is applied to the vehicle control unit by the comparator, so that the vehicle control unit is activated.

In another embodiment, the MCU may be operated according to the activation of the vehicle control unit and may check whether gas leaks in the vehicle, and then may automatically transmit whether the gas leaks in the vehicle to an information display unit of the vehicle or a designated user.

In another aspect, the present disclosure provides a method of detecting leakage of gas of a fuel cell vehicle. The method includes a first operation of, when a power supply of the fuel cell vehicle is turned off, applying power to a comparator within a vehicle control unit, switching power of a gas sensor at regular periodic intervals, and determining, by the comparator, whether a variation in temperature measured by the gas sensor exceeds a predetermined value. The method includes a second operation of switching the power of the gas sensor into normal power when the variation in temperature exceeds the predetermined value. The method includes a third operation of measuring, by a detecting unit within the gas sensor, a concentration of gas in a state where the power of the gas sensor is the normal power.

In one embodiment, the method may further include, after the third operation, a fourth operation of, when the concentration of gas measured by the detecting unit exceeds the predetermined concentration, activating the vehicle control unit according to the application of power to the vehicle control unit of the vehicle.

In another embodiment, the method may further include, after the fourth operation, a fifth operation of activating a micro controller unit (MCU) by the power of the vehicle control unit, and automatically transmitting whether the gas leaks in the vehicle to an information display unit of a vehicle system or a designated user.

In still another embodiment, when the variation in temperature change does not exceed the predetermined value, the first operation may be performed again.

In yet another embodiment, the method may further include an operation of, when the concentration of gas measured by the detecting unit is less than a predetermined concentration value, switching the power of the gas sensor to a state where the power of the gas sensor is switched at regular periodic intervals again.

In still another embodiment, when it is determined that the gas leaks in the vehicle, the power of the gas sensor may be maintained with normal power.

In a further embodiment, in the state where the power of the gas sensor is switched at regular periodic intervals again, the first operation may be performed again.

According to the various embodiments of the present disclosure, it is possible to detect whether gas leaks even without heating the heater of the detecting unit within the gas sensor. Thus, even though gas leakage is periodically detected when the vehicle is off, i.e., not started, it is possible to prevent a battery of the vehicle from being discharged.

Even with the vehicle not started or turned off, or in other words, a state where the vehicle does not travel or drive, it is possible to detect a concentration of gas, thereby detecting even micro leakage.

Other aspects and embodiments of the disclosure are discussed herein.

It should be understood that the term "vehicle" or "vehicular" or other similar terms, as used herein, are inclusive of motor vehicles in general such as: i) passenger automobiles including sports utility vehicles (SUV), buses, trucks; ii) various commercial vehicles; iii) watercraft including a variety of boats and ships; and iv) aircraft, and the like. The terms also may include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles that are both gasoline-powered and electric-powered.

The above and other features of the disclosure are discussed in further detail hereinbelow.

BRIEF DESCRIPTION OF THE DRAWINGS

The above and other features of the present disclosure will now be described in detail with reference to certain embodiments thereof illustrated in the accompanying drawings which are given herein below by way of illustration only, and thus are not intended to limit the present disclosure, and wherein.

Figure 1:
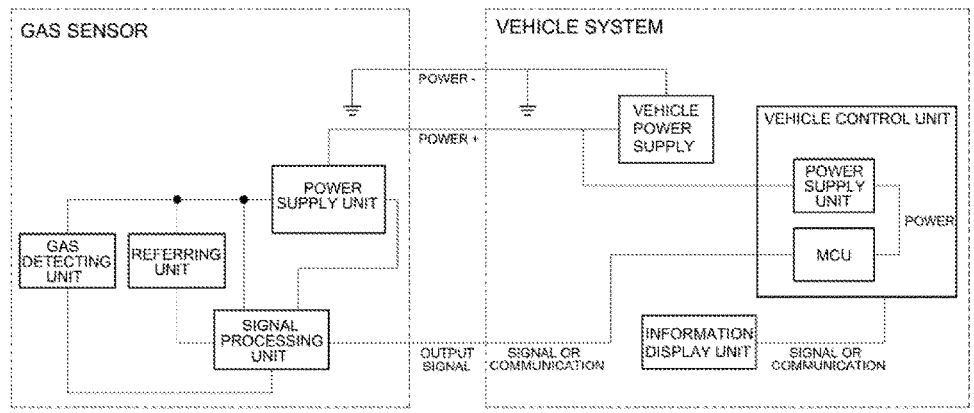
FIG. 1 is a diagram illustrating a configuration of a general vehicle system and gas sensor.

It should be understood that the appended drawings are not necessarily to scale, presenting a somewhat simplified representation of various preferred features illustrative of the basic principles of the disclosure. The specific design features of the embodiments as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with various embodiments, it will be understood that present description is not intended to limit the disclosure to those particular embodiments. On the contrary, the disclosure is intended to cover not only the embodiments illustrated and/or described herein, but also various alternatives, modifications, equivalents and other embodiments, which may be included within the spirit and scope of the disclosure as defined by the appended claims.

Hereinafter, one embodiment of the present disclosure is described in more detail with reference to the accompanying drawings. The embodiments of the present disclosure may be modified in various forms, and the scope of the present disclosure is not interpreted as being limited to the embodiments described below. The embodiments illustrated and described herein are provided for more completely explaining the present disclosure to those skilled in the art.

The terms " . . . part", " . . . unit", " . . . module", and the like described in the specification are intended to mean units for processing at least one function and operation and may be implemented by hardware components or software components and combinations thereof.

Gas used in the present disclosure is intended to mean gas that is usable as fuel in a fuel cell system, and hydrogen may be used as fuel. The fuel cell system may be mounted or installed in a vehicle, and may be generally divided into an air supply system, a hydrogen supply system, a system managing water and heat, and a vent system. Further, the fuel cell system may include a vehicle system 1 controlling a power supply 12 of a vehicle and an operation state of the vehicle. The vehicle system may include a vehicle control unit 11.

The vehicle (hereinafter, described as the "fuel cell vehicle") is equipped with the fuel cell system and may determine whether gas leaks by operating a fuel gas detecting device after starting the vehicle. During actual travelling or driving of the vehicle, even though gas leaks, when the quantity of gas leakage is small, it is impossible to easily detect the gas leakage. However, in a state where the vehicle stops, particularly, in a state where the vehicle is off, i.e., is not running or not started, the leakage of gas may be relatively easily detected. However, a process of detecting the leakage requires time. It may be difficult or impossible to force a user to stop the vehicle or turn off the vehicle for the required time. Therefore, that practicability of the method is degraded.

Further, in a case where the vehicle is travelling, i.e., is running and being driven, even though the quantity of gas leaking via the leakage may be large, a concentration of gas is easily diluted by wind resulting from the movement of the vehicle, so that the gas is not well detected by a detector, and the gas may not have much influence on safety of the vehicle. However, even though the quantity of gas leakage may be small, when the vehicle stops, or when the vehicle stops in a confined or sealed space (for example, a parking garage), the danger by the gas leakage is sharply increased. The confined space may be filled with the fuel gas at a relatively high concentration. Accordingly, the vehicle using gas as fuel should include a safe system to prevent an explosion, which is the worst case scenario when the gas leaks. A gas detecting device can be an essential feature when the vehicle travels, stops, is started, and starts off.

FIG. 1 is a diagram illustrating a general configuration of a fuel cell vehicle. The fuel cell vehicle may include a vehicle system 1 including a vehicle control unit 11 for controlling a general operation state of the vehicle. The fuel cell vehicle may also include a vehicle power supply 12, and an information display unit 13 connected with the vehicle control unit 11 by a signal and communication and displaying information relative to the state of the vehicle. The vehicle control unit 11 may include a power supply 111 of the vehicle control unit and a micro controller unit (MCU). The MCU may be operated by being electrically connected to the power supply 111 for receiving power. The power supply 111 of the vehicle control unit may be connected with the vehicle power supply and may receive power therefrom. Further, the fuel cell vehicle may be provided with a gas sensor 2, which is connected with the vehicle power supply 12 of the vehicle and receives power. The gas sensor 2 may include a power supply unit 21 of the gas sensor, a detecting unit (a gas detecting unit) 22, a referring unit 23, and a signal processing unit 24. The detecting unit 22 may detect leakage of gas, and the referring unit 23 may measure a measurement value as a control group for a value measured by the detecting unit 22. The values measured by the gas detecting unit 22 and the referring unit 23 may be transmitted to the vehicle system 1 through the signal processing unit 24. Particularly, the values measured by the gas detecting unit 22 and the referring unit 23 may be transmitted to the MCU mounted in the control unit 11 of the vehicle system 1.

Figure 2:
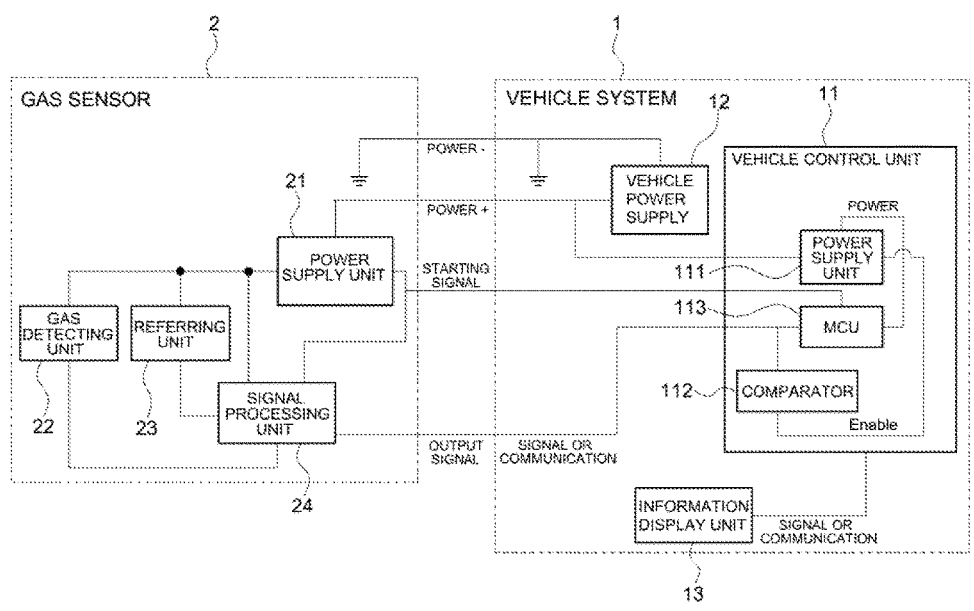
FIG. 2 is a diagram illustrating a configuration of a vehicle system, a vehicle control unit, and a gas sensor according to one embodiment of the present disclosure.

FIG. 2 is a diagram illustrating a configuration of a fuel cell vehicle according to one embodiment of the present disclosure. In this embodiment, in addition to the configuration of the fuel cell vehicle of FIG. 1, the fuel cell vehicle may further include a comparator 112 inside a vehicle control unit 11 of the vehicle system 1. Further, an MCU of the vehicle control unit 11 may be directly connected with a power supply unit 21 of a gas sensor, so that the power of the gas sensor may be turned on/off by the MCU independently of the vehicle power supply 12. In the present disclosure, the comparator 112 may serve to receive, compare, and determine a signal or communication value output from a signal processing unit 24 of the gas sensor 2. Further, the MCU of the vehicle and the power supply unit 21 of the gas sensor may be directly connected to each other. Also, the MCU may control an on/off state of the power supply unit 21 of the gas sensor by a starting signal.

According to the present disclosure, the fuel cell vehicle may be started (on), that is, the fuel cell system is operating, and the fuel cell vehicle may be turned off. Hereinafter, the driving or operation of the constituent elements according to each situation will be described.

A state where the vehicle is started may be a general operation state of the vehicle, i.e., a state where the vehicle travels or is driven on a road. In this state, power may be applied to the vehicle, a stack may be driven, a motor is rotated by an output of the stack, the vehicle may obtain momentum, and power is applied to the power supply 111 of the vehicle control unit, so that the fuel cell vehicle may be normally operated. The power of the gas sensor may maintain an on-state at normal times by transmitting, by the power supply 111 of the vehicle control unit, a start signal to the power supply unit 21 of the gas sensor. In other words, the gas sensor 2 may always be operating at such normal times. Accordingly, the power is continuously supplied to the gas detecting unit 22, the referring unit 23, and the signal processing unit 24 of the gas sensor 2, so that it is possible to detect leakage of gas from the fuel cell vehicle.

Figure 3:
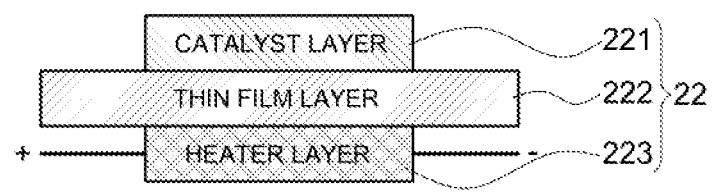
FIG. 3 is a diagram illustrating a configuration of a detecting unit for detecting gas within a gas sensor.
Figure 4:
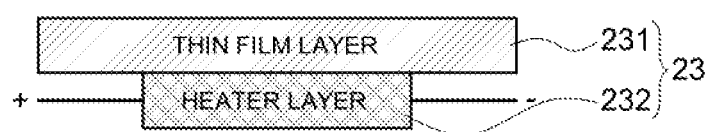
FIG. 4 is a diagram illustrating a configuration of a referring unit provided inside the gas sensor.

FIGS. 3 and 4 are diagrams illustrating one embodiment of the gas detecting unit 22 and the referring unit 23 that may be provided inside the gas sensor 2. More specifically, FIG. 3 is a diagram illustrating the gas detecting unit 22, and FIG. 4 is a diagram illustrating the referring unit 23. The gas detecting unit 22 and the referring unit 23 may commonly include heater layers 223 and 232 and thin film layers 222 and 231 therein, respectively. The heater layers 223 and 232 may be heating means or elements capable of and/or configured to generate heat for increasing a temperature and activating a gas detection. Accordingly, in the gas sensor 2, a heater needs to be operated, so that the gas sensor 2 may consume more current and power, compared to a sensor for other uses that has no heater layers 223 and 232.

Also in this embodiment, the heater layers 223 and 232 may be formed of platinum wires. The thin film layers 222 and 231 may serve to prevent gas within a space from being excessively rapidly heated according to a direct contact between the heater layers 223 and 232 and gas within a space, in which the sensor is provided. The thin film layers 222 and 231 may be formed of a suitable material, such as silicon.

In comparing FIGS. 3 and 4, the gas detecting unit 22 is different from the referring unit 23 in that the gas detecting unit has a catalyst layer 221 positioned at an upper end. The catalyst layer 221 may serve as one form of a heating means for activating a gas detection. The catalyst layer 221 may be formed of platinum powder or the like, and may generate a heating reaction by a catalysis reaction when in contact with hydrogen, when hydrogen is used as the gas. Accordingly, the catalyst layer 221 may be formed of various materials, which may generate a heating reaction with a particular gas that is usable as the gas. Further, the gas detecting unit 22 may perform a temperature sensor function for detecting a temperature change generated by the heating reaction. That is, the gas detecting unit 22 may serve as a thermometer for detecting heat through the temperature sensor function, wherein the heat is simultaneously generated when the heating reaction is generated. Accordingly, the gas sensor 2 may first determine whether the gas leaks or is leaking based on the temperature change by the catalysis reaction in the detecting unit 22. Further, when normal power is supplied to the power supply unit 21 of the gas sensor, the detecting unit 22, which may be provided inside the gas sensor 2, may measure an accurate concentration of gas.

Also in this embodiment, in a state where the power supply 12 of the vehicle is off, the power supply 111 of the vehicle control unit may also be in an off state. However, the comparator 112 within the vehicle control unit 11 may be connected to the power supply 111 of the vehicle control unit and the power supply 12 of the vehicle, and power may be applied only to the comparator 112. The gas sensor 2, which is operated by a starting signal, may be changed from a normal power state into a state where power is intermittently applied, according to the vehicle being turned-off. In other words, in this embodiment of the present disclosure, in a state where the starting signal is applied, power is continuously supplied to the gas sensor 2, and when the starting signal is off, which is an event, power may be intermittently applied to the gas sensor 2 at every predetermined time interval or regular periodic interval after the event. That is, according to the intermittent application of the power to the gas sensor 2, the power of the gas sensor may be switched at regular periodic intervals. In the specification of the present disclosure, a state where the power of the gas sensor is switched at regular periodic intervals may be called a "sleep mode". By the intermittent application of power, it may be impossible to sufficiently heat the heater of the detecting unit 22 within the gas sensor 2, so that detection accuracy itself may be decreased compared to detection accuracy when normal power is applied when the vehicle is turned on or started.

When gas leaks or there is a gas leak, a heating reaction may be generated in the catalyst layer 221 and a resistance value of the detecting unit 22 may be increased. The intermittent power is applied for simply measuring a resistance value, so that even though normal power is not applied, it is possible to measure a resistance value. However, power is intermittently applied, that is, the power of the gas sensor 2 is switched at regular periodic intervals, so that when the starting of the vehicle is off, i.e., the vehicle is turned off or not running, the currents and the quantities of power consumed by the detecting unit 22 and the gas sensor 2 may be considerably decreased, thereby preventing a battery from being discharged. In the intermittent application of power, a length of one period, a time may be freely determined, for which power is applied within the one period, and a time for which power is not applied within the one period, in consideration of a signal processing time and a specification of the signal processing unit 24 of the gas sensor 2, and a specification of a vehicle battery, and the like.

Hereinafter, an operation of the device is described according to the present disclosure for when gas leakage is detected in a starting off state of the vehicle. When the state of the vehicle is switched to the off state, i.e., the vehicle is not running or not started, the starting signal is off, so that power may be intermittently applied to the gas sensor, particularly, the power supply unit 21 of the gas sensor as described above. According to the intermittent application of power, power may also be intermittently applied to the detecting unit 22 and the referring unit 23 within the gas sensor 2. A heater, which may be provided in the detecting unit 22 and the referring unit 23, may periodically measure a resistance value by the intermittent power.

Also in this embodiment, when gas leaks, and more particularly, when hydrogen leaks, a heating reaction by a catalyst may be generated in the catalyst layer 221, which may be provided at an outermost side of the detecting unit 22 and be in contact with hydrogen gas. In other words, an increase in a temperature of the detecting unit 22 may mean that gas, and more particularly, hydrogen, probably leaks in the vehicle where the device of the present disclosure is mounted.

In contrast to this, in the referring unit 23, the catalyst 221 is not provided at an outermost side, unlike the detecting unit 22, so that the referring unit 23 may maintain a uniform temperature regardless of the leakage of gas. Accordingly, the referring unit 23 may be provided as a control group for a temperature change of the detecting unit 22. The increase of both the resistance values measured in the detecting unit 22 and the referring unit 23 may mean that the increase in the temperature at a point, at which the gas sensor 2 is provided, is caused by other reasons, not by the leakage of gas.

Accordingly, in the present disclosure, when an amount or a degree of temperature increase of the detecting unit 22 compared to that of the referring unit 23 exceeds a predetermined value, it may be determined that the gas may leak or be leaking. Accordingly, the power supply unit 21 of the gas sensor is activated by transmitting a signal to the signal processing unit 24 of the gas sensor 2. In this instance, the predetermined temperature value may mean a predetermined temperature value (° C.), and may be predetermined by various design sizes, such as a specification of the vehicle, hydrogen pressure of a fuel tank, pressure of a pipe, or the like. In other words, normal power may be applied to the gas sensor 2. After the normal power is applied to the gas sensor 2, the gas sensor 2 may accurately measure a concentration value of gas of the space, in which the gas sensor 2 is provided, over a sufficient time, i.e., the sufficient heating of the heater. The signal processing unit 24 of the gas sensor 2 may transmit the measured accurate concentration value to the vehicle control unit 11. More specifically, the signal processing unit 24 of the gas sensor 2 may transmit the measured concentration value to the comparator 112 of the vehicle control unit 11 through a signal or communication, and determine through the comparator 112 when the concentration of gas exceeds a predetermined concentration. When it is determined that the measured concentration exceeds the predetermined concentration, i.e., it is determined that the leakage of gas is at a dangerous level, the vehicle control unit 11 may be activated. In other words, power may be applied to the vehicle control unit 11. When power is applied to the vehicle control unit 11, the MCU within the vehicle control unit 11 may be operated, and the MCU checks whether the gas leaks and checks a vehicle state, and performs a subsequent process according to a response strategy when the gas leakage is detected. In this embodiment, the MCU may transmit information related to the gas leakage to the information display unit 13 of the vehicle system 1, or perform an algorithm implemented so that a notice is automatically transmitted to a designated user and the like.

Figure 5:
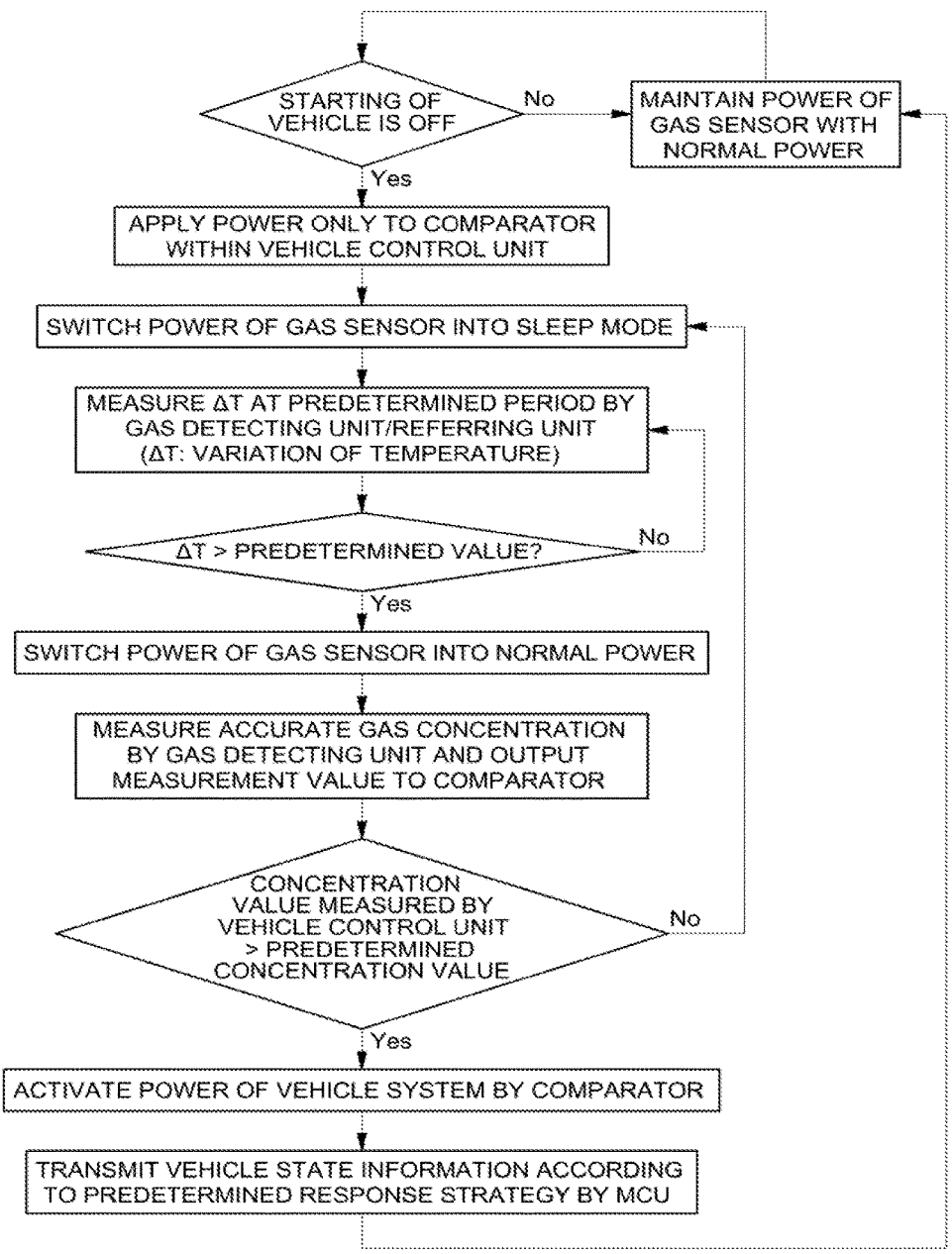
FIG. 5 is a flowchart of a gas leakage detecting method according to another embodiment of the present disclosure.

Hereinafter, a gas leakage detecting method of a fuel cell vehicle is described referring to FIG. 5 and according to another embodiment of the present disclosure. The gas leakage detecting method according to the present disclosure may be performed in a state where the vehicle is off, i.e., is turned off or not started. When the vehicle is not in the off state, i.e., the vehicle is started or running, the power supply unit 21 of the gas sensor may maintain normal power, and continuously check at a regular periodic interval whether the vehicle stated or running or whether the vehicle is in the off state, i.e., is turned off, not running, or not started.

In this embodiment, with the vehicle in the off state, power is applied only to the comparator 112 within the control unit 11, and a starting signal transmitted to the gas sensor 2 disappears, so that the gas sensor 2 may be automatically switched to a sleep mode, in which power is intermittently applied. The detecting unit 22 and the referring unit 23 within the gas sensor 2 may measure resistance values according to a predetermined period or time interval to measure temperatures of the detecting unit 22 and the referring unit 23. When a variation of the measured temperature exceeds a predetermined temperature value, the gas sensor may determine that there may be a gas leakage. Accordingly, the power supply unit 21 of the gas sensor may be switched from the sleep mode to a normal power mode, and the gas sensor 2 may accurately measure a concentration of gas by normal power. When the variation of temperature measured in the detecting unit 22 and the referring unit 23 does not exceed the predetermined value, it is determined that there is no gas leakage, so that a process of measuring a temperature variation by the detecting unit 22 and the referring unit 23 may be repeatedly performed again at predetermined time periods or intervals.

In the meantime, the result of the measurement of the accurate gas concentration by the gas sensor 2 by the normal power may be transmitted and output to the comparator 112 within the vehicle control unit 11. The comparator 112 may compare the measured gas concentration value and a predetermined concentration value and determine whether the measured gas concentration value is larger or greater than the predetermined concentration value. The fact that the measured gas concentration exceeds the predetermined concentration means a high probability of a gas leakage, so that the power supply 111 of the vehicle control unit may be activated by the comparator 112. When the power supply 111 of the vehicle control unit is activated, the MCU within the vehicle control unit may be operated. The MCU checks whether there is a gas leak and checks a vehicle state and performs a subsequent process according to a response strategy when the gas leakage is detected. In this embodiment, the MCU may transmit information related to the gas leakage to the information display unit 13 of the vehicle system 1, or perform an algorithm implemented so that a notice is automatically transmitted to a designated user and the like.

When the measured concentration received from the comparator 112 does not exceed the predetermined concentration, it is determined that the gas does not leak even though the variation of temperature of the referring unit 23 and the detecting unit 22 exceeds the predetermined value. Thus, the power supply unit 21 of the gas sensor is switched into a sleep mode, in which power is intermittently applied to the power supply unit 21 of the gas sensor, so that an operation of measuring the variations of the temperatures of the detecting unit 22 and the referring unit 23 at a predetermined period may be repeatedly performed.

Accordingly, the device according to the present disclosure may solve a problem in the related art. In the case where the gas sensor is operated by applying normal power, when the vehicle stops and the vehicle is turned off, the supply unit 21 of the gas sensor should be blocked by a discharge of the battery. In a state where the vehicle is off, and more specifically, where the vehicle is maintained for a long time in the off state within a sealed space, in such a situation, the concentration of gas may be highest. In the present disclosure, gas detecting performance, and safety securement according to the gas detecting performance, are considerably improved compared to those of the related art. Further, it is difficult to detect micro leakage because the micro leakage is distributed by moving air and other wind while the vehicle is travelling or being driven. However, when the vehicle stops and is turned off, the device of the present disclosure may detect even the micro leakage, thereby resulting in improved safety in relation to the gas leakage.

As described above, in the various embodiments of the present disclosure, even in the off state of the vehicle, the gas sensor 2 may be periodically operated and determine whether gas, such as hydrogen is leaking. It is possible to rapidly respond to the leakage, thereby preventing a safety accident. Further, the present disclosure adopts the sleep mode, in which power is intermittently applied, so that it is possible to prevent the vehicle battery from being discharged and yet still detect gas leakage for a period of time with the vehicle off, such as for a period of 24 hours.

The core spirit of the present disclosure is to measure a temperature at a predetermined period by intermittently applying power to the power supply unit 21 of the gas sensor when the vehicle is off or not running, to determine whether gas leaks, to supply normal power to the gas sensor 2, and to accurately measure a concentration of gas when variation of temperature, in which gas leakage is suspected, occurs, and to determine whether gas leaks. In the above description, the exemplary embodiments of the present disclosure have been described. However, those with ordinary skill in the art to which the present disclosure pertains may variously modify and alter the present embodiments without departing from the spirit of the present disclosure recited in the claims by adding, changing, and deleting constituent elements, and the modification and alteration also belong to the scope of the present disclosure.

In the description of the embodiments of the present disclosure, a detailed description of known configurations or functions incorporated herein will be omitted when it is determined that the detailed description may make the subject matter of the present disclosure unclear. The terms which will be described below are terms defined in consideration of the functions in the embodiments of the present disclosure, and may be different according to users, intentions of the users, or customs. Therefore, the definitions should be made based on the entire contents of the present specification. Accordingly, the detailed description of the disclosed embodiments does not intend to limit the present disclosure to those embodiments, and it shall be construed that the accompanying claims include other embodiments.

The disclosure has been described in detail with reference to specific embodiments thereof. However, it will be appreciated by those having ordinary skill in the art that changes may be made in these embodiments without departing from the principles and spirit of the disclosure, the scope of which is defined in the appended claims and their equivalents.

What is claimed is:

1. A device for detecting leakage of gas of a fuel cell vehicle, the device comprising:
   a gas sensor configured to determine whether gas leaks based on a change in a temperature by a catalyst reaction; and
   a vehicle control unit including a comparator configured to read a variation in temperature from the gas sensor, and configured to control a fuel cell vehicle,
   wherein in a power off state of the fuel cell vehicle, a power application state is maintained in the comparator, power of the gas sensor is switched at regular periodic intervals, the comparator determines the variation in temperature measured by the gas sensor, and, when the variation in temperature exceeds a predetermined value, the power of the gas sensor is switched to normal power.

2. The device of claim 1, further comprising:
   a micro controller unit (MCU) within the vehicle control unit;
   a vehicle control unit power supply configured to supply power to the vehicle control unit;
   a detecting unit including a catalyst layer inside the gas sensor; and
   a referring unit, which does not include a catalyst layer inside the gas sensor,
   wherein, after the power of the gas sensor is switched to the normal power, when the concentration of gas measured by the detecting unit exceeds a predetermined value, power is applied to the vehicle control unit by the comparator, so that the vehicle control unit is activated.

3. The device of claim 2, wherein the MCU is operated according to the activation of the vehicle control unit and checks whether gas leaks in the vehicle, and then automatically transmits whether the gas leaks in the vehicle to an information display unit of the vehicle or a designated user.

4. A method of detecting leakage of gas of a fuel cell vehicle, comprising:
- a first operation of, when a power supply of the fuel cell vehicle is turned off, applying power to a comparator within a vehicle control unit, switching power of a gas sensor at regular periodic intervals, and determining, by the comparator, whether a variation in temperature measured by the gas sensor exceeds a predetermined value;
- a second operation of switching the power of the gas sensor to normal power when the variation in temperature exceeds the predetermined value; and
- a third operation of measuring, by a detecting unit within the gas sensor, a concentration of gas in a state where the power of the gas sensor is the normal power.

5. The method of claim 4, further comprising:
after the third operation, a fourth operation of, when the concentration of gas measured by the detecting unit exceeds the predetermined concentration, activating the vehicle control unit according to the application of power to the vehicle control unit of the vehicle.

6. The method of claim 5, further comprising:
after the fourth operation, a fifth operation of activating a micro controller unit (MCU) by the power of the vehicle control unit, and automatically transmitting whether the gas leaks in the vehicle to an information display unit of a vehicle system or a designated user.

7. The method of claim 6, wherein, when the gas sensor determines that the gas leaks in the vehicle, the power of the gas sensor is maintained with normal power.

8. The method of claim 4, wherein, when the variation in temperature does not exceed the predetermined value, the first operation is performed again.

9. The method of claim 4, further comprising:
- a sixth operation of, when the concentration of gas measured by the detecting unit is less than a predetermined concentration value, switching the power of the gas sensor to a state where the power of the gas sensor is switched at regular periodic intervals again.

10. The method of claim 9, wherein, in the state where the power of the gas sensor is switched at regular periodic intervals again, the first operation is performed again.

* * * * *